(12) United States Patent
Oldani (10) Patent No.: US 11,599,159 B2
(45) Date of Patent: Mar. 7, 2023

(54) SLIDING DOUBLE-PIVOT HINGE

(71) Applicant: Microsoft Technology Licensing, LLC, Redmond, WA (US)

(72) Inventor: Michael Oldani, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 17/329,369

(22) Filed: May 25, 2021

(65) Prior Publication Data

US 2022/0382337 A1 Dec. 1, 2022

(51) Int. Cl.
*G06F 1/16* (2006.01)
*E05D 3/18* (2006.01)
*E05D 3/12* (2006.01)
*E05D 11/08* (2006.01)

(52) U.S. Cl.
CPC ............ *G06F 1/1681* (2013.01); *E05D 3/12* (2013.01); *E05D 3/18* (2013.01); *E05D 11/082* (2013.01); *E05Y 2900/606* (2013.01)

(58) Field of Classification Search
CPC .................................................. G06F 1/1681
See application file for complete search history.

(56) References Cited

U.S. PATENT DOCUMENTS

| | | | |
|---|---|---|---|
| 7,836,554 B2 | 11/2010 | Fu | |
| 8,451,601 B2* | 5/2013 | Bohn | G06F 1/1681 16/334 |
| 8,773,849 B2* | 7/2014 | Bohn | H04M 1/022 361/679.28 |

(Continued)

FOREIGN PATENT DOCUMENTS

| | | |
|---|---|---|
| CN | 110969938 A | 4/2020 |
| CN | 110197624 B | 4/2021 |

(Continued)

OTHER PUBLICATIONS

"TH-153 Hinge—Double Pivot—Free Stopping the monitor can be stopped at any angle", Retrieved From: https://www.alibaba.com/product-detail/TH-153-Hinge-Double-Pivot-Free_50032923416.html, Retrieved Date: Apr. 26, 2021, 9 Pages.

(Continued)

*Primary Examiner* — Lisa Lea-Edmonds
(74) *Attorney, Agent, or Firm* — Holzer Patel Drennan (57) ABSTRACT

Conventional laptop computers may utilize a door-hinge style or bezel-behind-base style hinge to connect a display with a keyboard of the laptop computer. Typically, these hinges present an undesirable discontinuous visual impression to the user. In the disclosed technology, a leading edge of a display abuts a leading edge of a keyboard. The disclosed sliding double-pivot hinge places a pivot axis parallel and coincident with the abutting interface, the leading edges of the display and the keyboard remain abutting throughout a rotational range of motion of the display with reference to the keyboard. The resulting visual impression to the user is that the display is contiguous with the keyboard regardless of the display angle. Further, the disclosed sliding double-pivot hinge may be used in a kickstand to permit the kickstand to rotate up to 180 degrees to fold back on itself and lay flat against an associated computing device.

20 Claims, 8 Drawing Sheets

(56) References Cited

U.S. PATENT DOCUMENTS

| | | | | |
|---|---|---|---|---|
| 8,780,570 B2* | 7/2014 | Bohn | ..................... | H04M 1/022 |
| | | | | 361/728 |
| 9,069,531 B2* | 6/2015 | Bohn | ..................... | H04M 1/022 |
| 9,535,465 B2* | 1/2017 | Bohn | ..................... | G06F 1/1681 |
| 10,327,347 B2* | 6/2019 | Kim | ...................... | E05D 11/082 |
| 11,048,296 B2* | 6/2021 | Hsu | ....................... | G06F 1/1652 |
| 11,366,498 B2* | 6/2022 | Shibayama | ............ | G06F 1/1616 |
| 11,382,228 B2* | 7/2022 | Chen | ..................... | H05K 5/0226 |
| 2012/0162866 A1* | 6/2012 | Bohn | ................... | H04M 1/0216 |
| | | | | 361/679.01 |
| 2012/0206864 A1* | 8/2012 | Bohn | ..................... | G06F 1/1681 |
| | | | | 361/679.01 |
| 2012/0243207 A1 | 9/2012 | Wang et al. | | |
| 2018/0066465 A1* | 3/2018 | Tazbaz | ................ | E05D 11/1007 |
| 2018/0329462 A1 | 11/2018 | Larsen et al. | | |
| 2019/0094917 A1* | 3/2019 | Schmelzle | ............ | E05F 1/1253 |
| 2019/0132975 A1* | 5/2019 | Kim | .................... | H04M 1/0268 |

FOREIGN PATENT DOCUMENTS

| | | |
|---|---|---|
| JP | 5896670 B2 | 3/2016 |
| WO | 2017087343 A1 | 5/2017 |
| WO | 2020211257 A1 | 10/2020 |

OTHER PUBLICATIONS

"International Search Report and Written Opinion Issued in PCT Application No. PCT/US22/026855", dated Aug. 4, 2022, 14 Pages.

* cited by examiner

SLIDING DOUBLE-PIVOT HINGE

BACKGROUND

Computing devices encompass a variety of devices that can be programmed to carry out one or more specific sets of arithmetic and/or logical operations, with or without user input. Some computing devices utilize one or more hinges to pivotally connect two or more components of the computing device. Conventionally, such computing device hinges often take the form of a door-hinge style or a bezel-behind-base style.

SUMMARY

Implementations described and claimed herein provide a sliding double pivot hinge comprising: a first hinged component including a first hinge cavity and a first protruding stop within the first hinge cavity; a first leaf seated within the first hinge cavity and constrained to linear motion by the first hinge cavity, the first leaf including a first stop aperture that receives the first protruding stop, the first leaf further including a first knuckle; a first compression spring seated within the first stop aperture and adjacent the first protruding stop; a second hinged component including a second hinge cavity and a second protruding stop within the second hinge cavity; a second leaf seated within the second hinge cavity and constrained to linear motion by the second hinge cavity, the second leaf including a second stop aperture that receives the second protruding stop, the second leaf further including a second knuckle; a second compression spring seated within the second stop aperture and adjacent the second protruding stop; and a double-barreled link rotationally connecting the first knuckle of the first leaf to the second knuckle of the second leaf.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

A conventional door-hinge style hinge typically utilizes a pair of hinges located at or near endpoints of the hinged connection between the hinged components. Door-hinge style hinges are visibly contiguous with one of the hinged components, and rotatable with regard to the other of the hinged components. A visible gap is present between the door-hinge style hinges and within the hinged connection beyond the door-hinge style hinges. The door-hinge style hinge yields a discontinuous visual impression of the hinge to the user as hinge varies between a visual gap between the hinged components and continuity created by the door-hinge style hinges.

A conventional bezel-behind-base style hinge typically utilizes a singular central hinge, or a pair of hinges connected to one of the hinged components within a bezel of the hinged component. As with the door-hinge style hinges, the bezel-behind-base style hinges are visibly contiguous with one of the hinged components and rotatable with regard to the other of the hinged components. When opened, the bezel of one of the hinged components drops behind the other of the hinged components, thus reducing the visible gap between the hinged components outside of the bezel-behind-base style hinge. However, the bezel-behind-base style hinge still yields a discontinuous visual impression of the hinge to the user as the visible gap is replaced by discontinuous visible portions of the hinged components, as well as some visible gap, dependent upon the user's viewing angle.

Conventional laptop computers may utilize a door-hinge style or a bezel-behind-base style hinge to connect a display component with a keyboard component of the laptop computer. Other computing devices may have a similar configuration with two components connected via one or more hinges, either in a door-hinge style or in a bezel-behind-base style. In all computing devices, presenting a continuous visual impression of the hinge to the user suggests a higher overall quality of the computing device to the user, and is thus desirable.

XYZ coordinates are shown in the FIGS. 1-3 and described below to illustrate directional features of the disclosed technology. Other coordinate systems may also be used with different orientations with similar effect. Further, some features are illustrated herein in broken lines. These features would not normally be visible from an exterior of a computing device, other device, or hinged components described herein, and/or may appear far different from the depictions in FIGS. 1-3 but are nonetheless shown to illustrate the disclosed technology.

Figure 1:
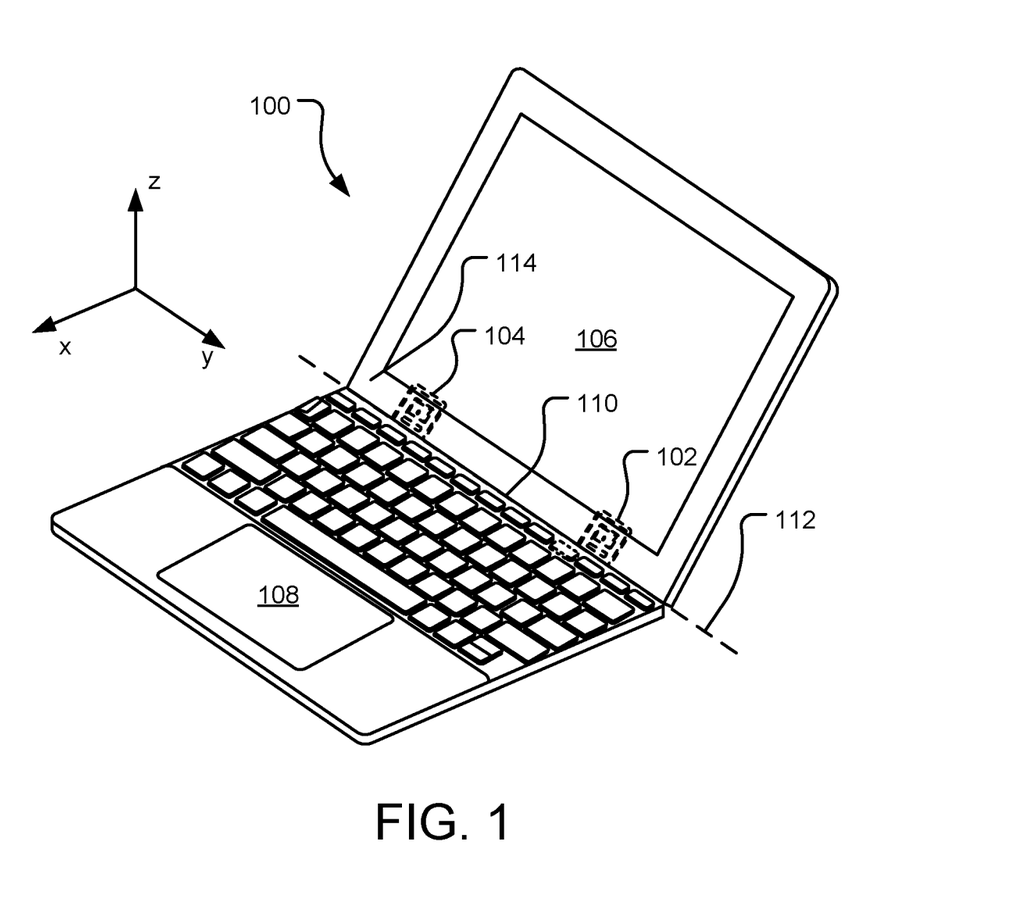
FIG. 1 illustrates a front perspective view of an example computing device having a pair of sliding double-pivot hinges.

FIG. 1 illustrates a front perspective view of an example computing device 100 having a pair of sliding double-pivot hinges 102, 104. The hinges 102, 104 each pivotally connect a display component (or a first hinged component) 106 with a keyboard component (or a second hinged component) 108 of the device 100. As a result, a user may position the display component 106 at a variety of angles with respect to the keyboard component 108 to achieve a desired viewing angle to the display component 106, or for other user considerations.

The hinges 102, 104 each include a first leaf seated within a first hinge cavity and constrained to linear motion by the first hinge cavity and a second leaf seated within a second recess and constrained to linear motion by the second hinge cavity. A double-barreled link rotationally connects the first knuckle of the first leaf to the second knuckle of the second leaf. The first leaf is extendible linearly from the first hinge cavity and the second leaf is extendible linearly from the second hinge cavity as the display component 106 is rotated with reference to the keyboard component 108. Selective extension of the first leaf is from the first hinge cavity and the second leaf from the second hinge cavity creates a technical advantage in that the first and second leaves recess within their respectively cavities and are completely hidden when the hinges 102, 104 are in a fully open orientation (e.g., oriented at approximately 180 degrees). When the hinges 102, 104 are placed in partially or fully closed positions (e.g., oriented at less than approximately 180 degrees), the first leaf extends from the first hinge cavity and the second leaf extends from the second hinge cavity to permit the hinge to pivot about pivot axis 112, which is described in further detail below.

In the depicted implementation, a leading edge of the display component 106 abuts a leading edge of the keyboard component 108 at abutting interface 110. The hinges 102, 104 are designed to pivot about the pivot axis 112 running parallel and coincident with the abutting interface 110 in the y-direction. By making the pivot axis 112 parallel and coincident with the abutting interface 110, the leading edges of the display component 106 and the keyboard component 108 remain abutting throughout a rotational range of motion (or operating range) of the display component 106 with reference to the keyboard component 108 (e.g., approximately 180 degrees). Abutting within the context of the present application includes physical contact and near physical contact (e.g., less than a 1 mm gap). The near physical contact condition at one more positions within the rotational range of motion of the display component 106 with reference to the keyboard component 108 may be caused by manufacturing variations within applicable tolerances.

In some implementations, the computing device 100 includes a flexible cover 114 that is attached (e.g., adhered to some or all of the display component 106 and the keyboard component 108 and bridges the abutting interface 110 between the display component 106 and the keyboard component 108. The flexible cover 114 in the area of the abutting interface 110 functions as a living hinge to further limit movement of the display component 106 with reference to the keyboard component 108 to rotation about the pivot axis 112. The resulting visual impression to the user, with or without the flexible cover 114, is that the display component 106 is contiguous with the keyboard component 108 throughout the rotational range of motion of the display component 106 with reference to the keyboard component 108 due to the pivot axis 112 running parallel and coincident with the abutting interface 110 in the y-direction (also referred to as a zero-gap hinge). The flexible cover 114 also may be used to conceal hardware of the hinges 102, 104 from the user. The flexible cover 114 is constructed from a flexible material (e.g., fabric, rubber, plastic, metal mesh) and is adhered or otherwise attached to each of the display component 106 and the keyboard component 108 and spans some or all of the abutting interface 110.

The operating range of the hinges 102, 104 may range from fully closed (or where the display component 106 overlies the keyboard component 108 with a 0-10 degree angle therebetween) to fully open (or where the display component 106 is oriented at a maximum oblique angle with reference to the keyboard component 108, which may position the display component 106 coplanar with the keyboard component 108). In various implementations, the hinges 102, 104 may have an approximately or substantially 180-degree operating range or range of motion (e.g., 170-190 degrees).

In various implementations, the hinges 102, 104 are extremely small in z-direction height (also referred to as overall thickness) due to packaging requirements in the device 100. For example, the hinges 102, 104 may each be less than 1.5 mm in z-direction height. Dimensions of the hinges 102, 104 in the x-y plane are often more flexible and may range widely depending upon the device 100 dimensions.

The device 100 is depicted as a laptop computer, however, the hinges 102, 104 may be similarly incorporated within a variety of computing devices, including mobile computing devices and desktop computing devices. Further, while the display component 106 and the keyboard component 108 are illustrated, and discussed in detail herein, the computing device 100 may include any two or more hinged components (e.g., a keyboard, a display screen, a touchscreen, a touchpad, a kickstand, a screen cover, and combinations thereof) for a computing device or other type of hinged device. For example, another computing device may be a 2-screen device and the hinge 102 may permit the 2-screen computing device to lay flat where the hinge 102 is oriented at 180-degrees and present the screens in close proximity to one another with only a small front gap or no front gap therebetween. In still further implementations, the device 100 may be a hinged accessory for a computing device that may be selectively attached to the computing device (e.g., via magnets), such as an accessory kickstand.

Figure 2:
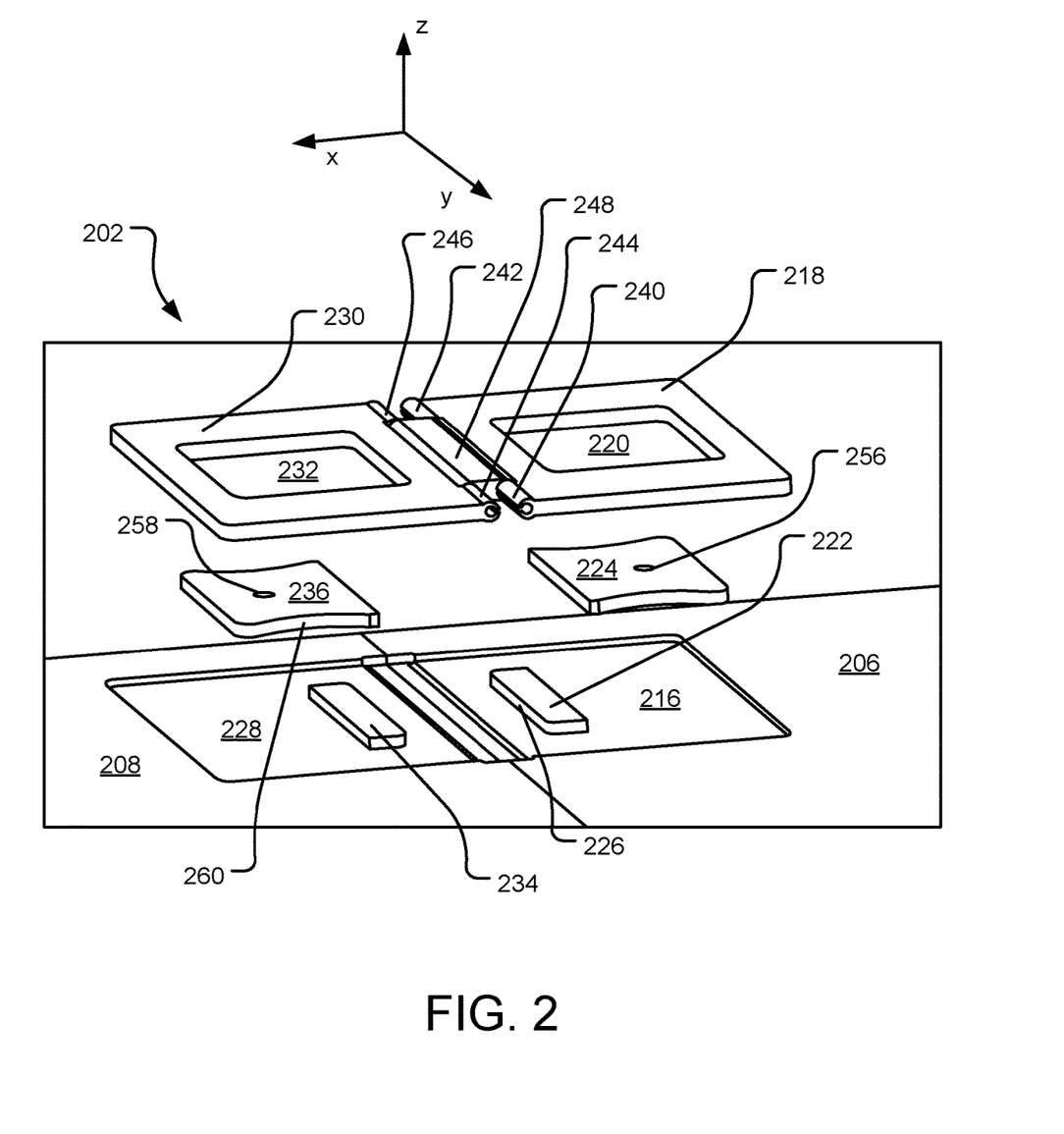
FIG. 2 illustrates a perspective exploded view of an example sliding double-pivot hinge.

FIG. 2 illustrates a perspective exploded view of an example sliding double-pivot hinge 202. The hinge 202 is one of one or more hinges that pivotally connect a first hinged component 206 with a second hinged component 208. For illustration purposes, the first hinged component 206 and the second hinged component 208 are each illustrated without an upper planar layer that would otherwise cover the hinge 202 and constrain it from motion in the z-direction (see e.g., top planar layers 564, 568 of FIG. 5).

An operating range of the hinge 202 may range from fully closed (or where the first hinged component 206 substantially overlies the second hinged component 208) to fully open (or where the first hinged component 206 is oriented at a maximum oblique angle with reference to the second hinged component 208, which may position the first hinged component 206 coplanar with the second hinged component 208, as illustrated). In various implementations, the hinge 202 may have an approximately or substantially 180-degree operating range or range of motion.

The first hinged component 206 includes a first hinge cavity 216 formed within the first hinged component 206 that substantially matches an outer perimeter of a first leaf 218 of the hinge 202. A tolerance is provided such that the first leaf 218 is able to slip-fit within the first hinge cavity 216 of the hinge 202. In various implementations, the first hinge cavity 216 is formed exclusively in the depicted lower planar layer of the first hinged component 206. In other implementations, the first hinge cavity 216 is partially formed in the depicted lower planar layer of the first hinged component 206, while a remainder of the first hinge cavity 216 is formed in the non-depicted upper planar layer. Regardless, when the depicted lower planar layer is assembled with the depicted upper planar layer and the first leaf 218 is oriented within the first hinge cavity 216, the first leaf 218 is constrained in all directions with the exception of linear movement in the x-direction.

The first leaf 218 has a generally rectangular outer perimeter in the x-y plane with a generally rectangular first stop aperture 220 therein. The generally rectangular outer perimeter permits the first leaf 218 to move (or slide) in the x-direction when placed within the first hinge cavity 216. As noted above, the first hinge cavity 216 has a similar size and shape to the first leaf 218 but is slightly bigger at least in the y-z plane to permit a slip fit of the first leaf 218 therein.

The first hinge cavity 216 further includes a first protruding stop 222 that fits within the first stop aperture 220 when the first leaf 218 is positioned within the first hinge cavity 216. The first protruding stop 222 is depicted as a generally rectangular protrusion from the first hinged component 206, with a similar width dimension in the y-direction as the first stop aperture 220 and a similar height dimension in the z-direction as the first hinge cavity 216 and the first leaf 218. In other implementations, the first protruding stop 222 may have a variety of sizes and shapes so long as they are capable of serving as a fixed point of reference for a first compression spring 224 that is seated within the first stop aperture 220 and adjacent the first protruding stop 222.

The first compression spring 224 is any resiliently compressible structure that has a working stroke within an operating range of the hinge 202. More specifically, the first leaf 218 moves (or slides) in and out of the first hinge cavity 216 as the hinge 202 is reoriented within its operating range, as discussed in further detail below. The first compression spring 224 is capable of resilient compression within a range that the first leaf 218 moves in and out of the first hinge cavity 216. The first compression spring 224 is compressed between the first leaf 218 and the first protruding stop 222 as the first leaf 218 is moved out of the first hinge cavity 216. As a result, the first compression spring 224 biases the first leaf 218 fully retracted within the first hinge cavity 216 where first contact surface 226 of the first protruding stop 222 is in contact with the first leaf 218.

The first leaf 218 further includes knuckles 240, 242 that extend from the first leaf 218 toward the second hinged component 208. Each of the knuckles 240, 242 includes a c-shaped structure extending a portion of the total length of the first leaf 218 in the y-direction. The c-shaped structures are each adapted to receive a first friction pin (not shown). In other implementations, each of the knuckles 240, 242 includes a closed (or o-shaped) structure in lieu of a c-shaped structure.

In various implementations, the hinge 202 includes a structure associated with the second hinged component 208 similar to that attached to the first hinged component 206, as described above. In other implementations, the hinge 202 structure associated with the second hinged component 208 may differ in various sizes, shapes, and dimensions depending on the design requirements of the overall hinge 202. The hinge 202 structure associated with the second hinged component 208 is described in further detail below.

The second hinged component 208 includes a second hinge cavity 228 formed within the second hinged component 208 that substantially matches an outer perimeter of a second leaf 230 of the hinge 202. A tolerance is provided such that the second leaf 230 is able to slip-fit within the second hinge cavity 228 of the hinge 202. In various implementations, the second hinge cavity 228 is formed exclusively in the depicted lower planar layer of the second hinged component 208. In other implementations, the second hinge cavity 228 is partially formed in the depicted lower planar layer of the second hinged component 208, while a remainder of the second hinge cavity 228 is formed in the non-depicted upper planar layer. Regardless, when the depicted lower planar layer is assembled with the depicted upper planar layer and the second leaf 230 is oriented within the second hinge cavity 228, the second leaf 230 is constrained in all directions with the exception of linear movement in the x-direction.

The second leaf 230 has a generally rectangular outer perimeter in the x-y plane with a generally rectangular second stop aperture 232 therein. The generally rectangular outer perimeter permits the second leaf 230 to move (or slide) in the x-direction when placed within the second hinge cavity 228. As noted above, the second hinge cavity 228 has a similar size and shape to the second leaf 230 but is slightly bigger at least in the y-z plane to permit a slip fit of the second leaf 230 therein.

The second hinge cavity 228 further includes a second protruding stop 234 that fits within the second stop aperture 232 when the second leaf 230 is positioned within the second hinge cavity 228. The second protruding stop 234 is depicted as a generally rectangular protrusion from the second hinged component 208, with a similar width dimension in the y-direction as the second stop aperture 232 and a similar height dimension in the z-direction as the second hinge cavity 228 and the second leaf 230. In other implementations of the second protruding stop 234 may have a variety of sizes and shapes so long as they are capable of serving as a fixed point of reference for a second compression spring 236 that is seated within the second stop aperture 232 and adjacent the second protruding stop 234.

The second compression spring 236 is any resiliently compressible structure that has a working stroke within an operating range of the hinge 202. More specifically, the second leaf 230 moves (or slides) in and out of the second hinge cavity 228 as the hinge 202 is reoriented within its operating range, as discussed in further detail below. The second compression spring 236 is capable of resilient compression within a range that the second leaf 230 moves in and out of the second hinge cavity 228. The second compression spring 236 is compressed between the second leaf 230 and the second protruding stop 234 as the second leaf 230 is moved out of the second hinge cavity 228. As a result, the second compression spring 236 biases the second leaf 230 fully retracted within the second hinge cavity 228 where second contact surface (not shown, mirror of first contact surface 226) of the second protruding stop 234 is in contact with the second leaf 230.

In various implementations, the compression springs 224, 236 are monolithic blocks of resiliently compressible material, such as a rubber, silicone, and/or foam. The compression springs 224, 236 may have a variety of sizes and shapes, so long as they within the stop apertures 220, 232 adjacent the protruding stops 222, 234, respectively. Further, the compression springs 224, 236 may specifically not occupy the entire available space within the stop apertures 220, 232, respectively. This provides room for deformation of the compression springs 224, 236 to occupy within the stop apertures 220, 232, respectively, when the leaves 218, 230 slide out of the hinge cavities 216, 228, respectively. In other words, this prevents (or reduces) densification of the material forming the compression springs 224, 236 (and a resulting exponentially pressure on the hinge cavities 216, 228, respectively. In the depicted example, the compression springs 224, 236 have a generally rectangular shape in the x-y plane, with two of each of their sides inset (e.g., inset side 260) to provide room for deformation. The compression springs 224, 236 further include deformation apertures 256, 258, respectively, to provide further room for deformation.

In other implementations, the compression springs 224, 236 are not susceptible to densification within the projected stroke of the compression springs 224, 236, and thus leaving free space within the stop apertures 220, 232, respectively, is not necessary (e.g., with a resiliently compressible foam). In still further implementations, the compression springs 224, 236 are mechanical rather than monolithic blocks of resiliently compressible material, such as leaf springs.

The second leaf 230 further includes knuckles 244, 246 that extend from the second leaf 230 toward the first hinged component 206. Each of the knuckles 244, 246 includes a c-shaped structure extending a portion of the total length of the second leaf 230 in the y-direction. The c-shaped structures are each adapted to receive a second friction pin (not shown). In other implementations, each of the knuckles 244, 246 includes a closed structure (and o-shaped structure) in lieu of a c-shaped structure.

The hinge 202 further includes a double-barreled link 248 that rotationally connects the knuckles 240, 242 of the first leaf 218 to the knuckles 244, 246 of the second leaf 230, via first and second friction pins, respectively. Each friction pins slide through one of the c-shaped structures of the knuckles 240, 242, 244, 246 and into a corresponding friction pin aperture (not shown) within the double-barreled link 248. As a result, the first leaf 218 and the second leaf 230 are generally free to rotate independently with reference to the double-barreled link 248, absent other constraints that may be in play as described in further detail below. In various implementations, a x-direction dimension of the double-barreled link 248 substantially equals a y-direction center-to-center distance between the first leaf 218 and the second leaf 230 when the hinge 202 is reoriented in a fully closed orientation. This permits a pivot axis (not shown, see e.g., pivot axis 112 of FIG. 1) to remain in a fixed location throughout the rotational operating range of the hinge 202. The fixed-location pivot axis is technically advantageous in that it allows the first hinged component 206 with a second hinged component 208 to remain in contact (or very close proximity) throughout a range of motion of the hinge 202.

Each of the first leaf 218, the second leaf 230, and the double-barreled link 248 may be made from a variety of generally rigid materials (e.g., metal alloys and rigid plastics) that meet projected loads applied on the hinge 202 by rotation of the first hinged component 206 with reference to the second hinged component 208, or other expected potential loads on the hinge 202.

Figure 3:
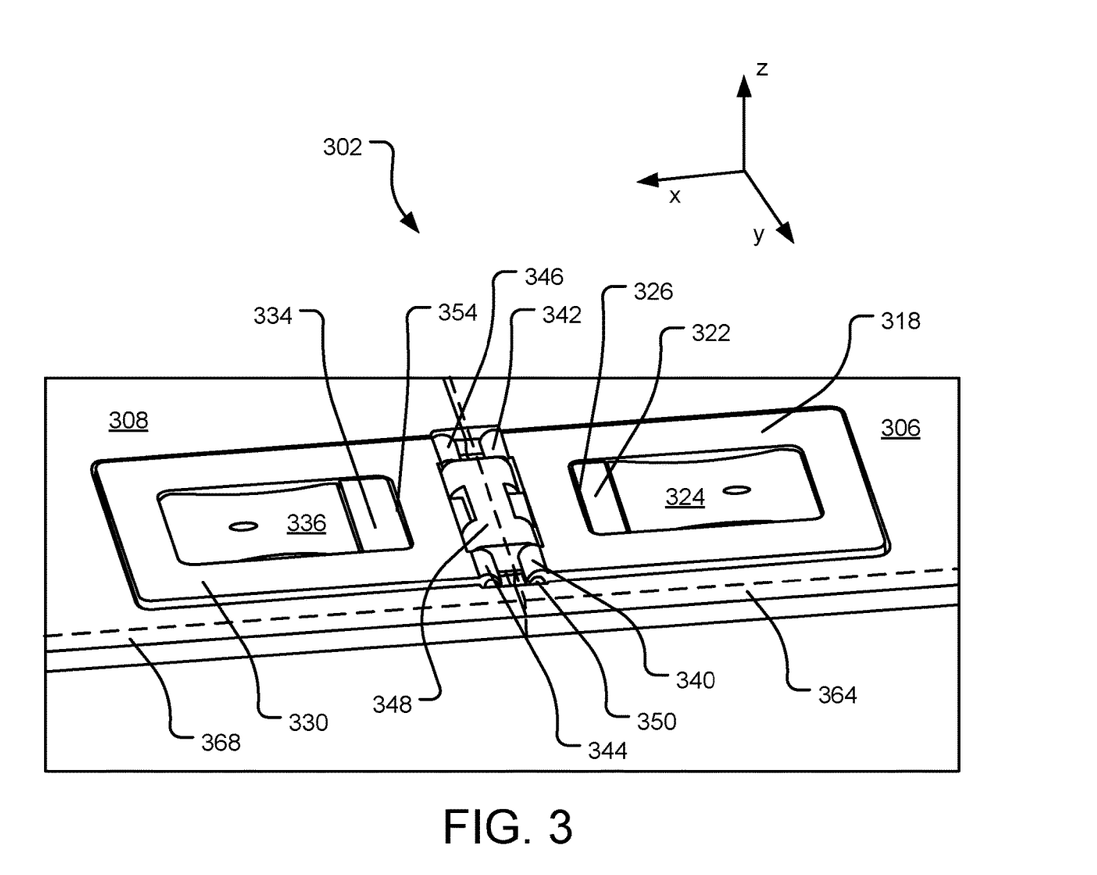
FIG. 3 illustrates a front perspective view of an example sliding double-pivot hinge in a fully open orientation.

FIG. 3 illustrates a front perspective view of an example sliding double-pivot hinge 302 in a fully open orientation. The hinge 302 is one of one or more hinges that pivotally connect a first hinged component 306 with a second hinged component 308. For illustration purposes, the first hinged component 306 and the second hinged component 308 are each illustrated with transparent upper planar layers 364, 368, respectively, that would otherwise conceal much of the hinge 302.

An operating range of the hinge 302 may range from fully closed (or where the first hinged component 306 substantially overlies the second hinged component 308) to fully open (or where the first hinged component 306 is oriented at a maximum oblique angle with reference to the second hinged component 308, which may position the first hinged component 306 coplanar with the second hinged component 308, as illustrated). In various implementations, the hinge 302 may have an approximately or substantially 180-degree operating range or range of motion.

The first hinged component 306 includes a first hinge cavity that substantially matches an outer perimeter of a first leaf 318 of the hinge 302. The first leaf 318 has a generally rectangular outer perimeter in the x-y plane with a generally rectangular first stop aperture therein. The generally rectangular outer perimeter permits the first leaf 318 to move (or slide) in the x-direction when placed within the first hinge cavity. The first hinge cavity includes a first protruding stop 322 that fits within the first stop aperture. The first protruding stop 322 serves as a fixed point of reference for a first compression spring 324 that is seated within the first stop aperture and adjacent the first protruding stop 322.

The first compression spring 324 is any resiliently compressible structure that has a working stroke within an operating range of the hinge 302. The first compression spring 324 is compressed between the first leaf 318 and the first protruding stop 322 as the first leaf 318 is moved out of the first hinge cavity. As a result, the first compression spring 324 biases the first leaf 318 fully retracted within the first hinge cavity where first contact surface 326 of the first protruding stop 322 is in contact with the first leaf 318, as shown.

The first leaf 318 further includes knuckles 340, 342 that extend from the first leaf 318 toward the second hinged component 308. Each of the knuckles 340, 342 includes a c-shaped structure extending a portion of the total length of the first leaf 318 in the y-direction. The c-shaped structures are each adapted to receive corresponding friction pins (e.g., friction pin 350).

In various implementations, the hinge 302 includes a structure associated with the second hinged component 308 similar to that attached to the first hinged component 306, as described above. In other implementations, the hinge 302 structure associated with the second hinged component 308 may differ in various sizes, shapes, and dimensions depending on the design requirements of the overall hinge 202. The hinge 302 structure associated with the second hinged component 308 is described in further detail below.

The second hinged component 308 includes a second hinge cavity that substantially matches an outer perimeter of a second leaf 330 of the hinge 302. The second leaf 330 has a generally rectangular outer perimeter in the x-y plane with a generally rectangular second stop aperture therein. The generally rectangular outer perimeter permits the second leaf 330 to move (or slide) in the x-direction when placed within the second hinge cavity. The second hinge cavity includes a second protruding stop 334 that fits within the second stop aperture. The second protruding stop 334 serves as a fixed point of reference for a second compression spring 336 that is seated within the second stop aperture and adjacent the second protruding stop 334.

The second compression spring 336 is any resiliently compressible structure that has a working stroke within an operating range of the hinge 302. The second compression spring 336 is compressed between the second leaf 330 and the second protruding stop 334 as the second leaf 330 is moved out of the second hinge cavity. As a result, the second compression spring 336 biases the second leaf 330 fully retracted within the second hinge cavity where second contact surface 354 of the second protruding stop 334 is in contact with the second leaf 330, as shown.

The second leaf 330 further includes knuckles 344, 346 that extend from the second leaf 330 toward the first hinged component 306. Each of the knuckles 344, 346 includes a c-shaped structure extending a portion of the total length of the second leaf 330 in the y-direction. The c-shaped structures are each adapted to receive corresponding friction pins.

The hinge 302 further includes a double-barreled link 348 that rotationally connects the knuckles 340, 342 of the first leaf 318 to the knuckles 344, 346 of the second leaf 330, via first and second friction pins, respectively. As a result, the first leaf 318 and the second leaf 330 are generally free to rotate independently with reference to the double-barreled link 348, absent other constraints that may be in play as described in further detail below. In various implementations, a x-direction dimension of the double-barreled link 348 substantially equals a y-direction center-to-center distance between the first leaf 318 and the second leaf 330 when the hinge 302 is reoriented in a fully closed orientation (see e.g., FIG. 6). The resulting technical effect is a pivot axis (not shown, see e.g., pivot axis 112 of FIG. 1) that remains in a fixed location throughout the rotational operating range of the hinge 302 without a substantial visible gap.

Figure 4:
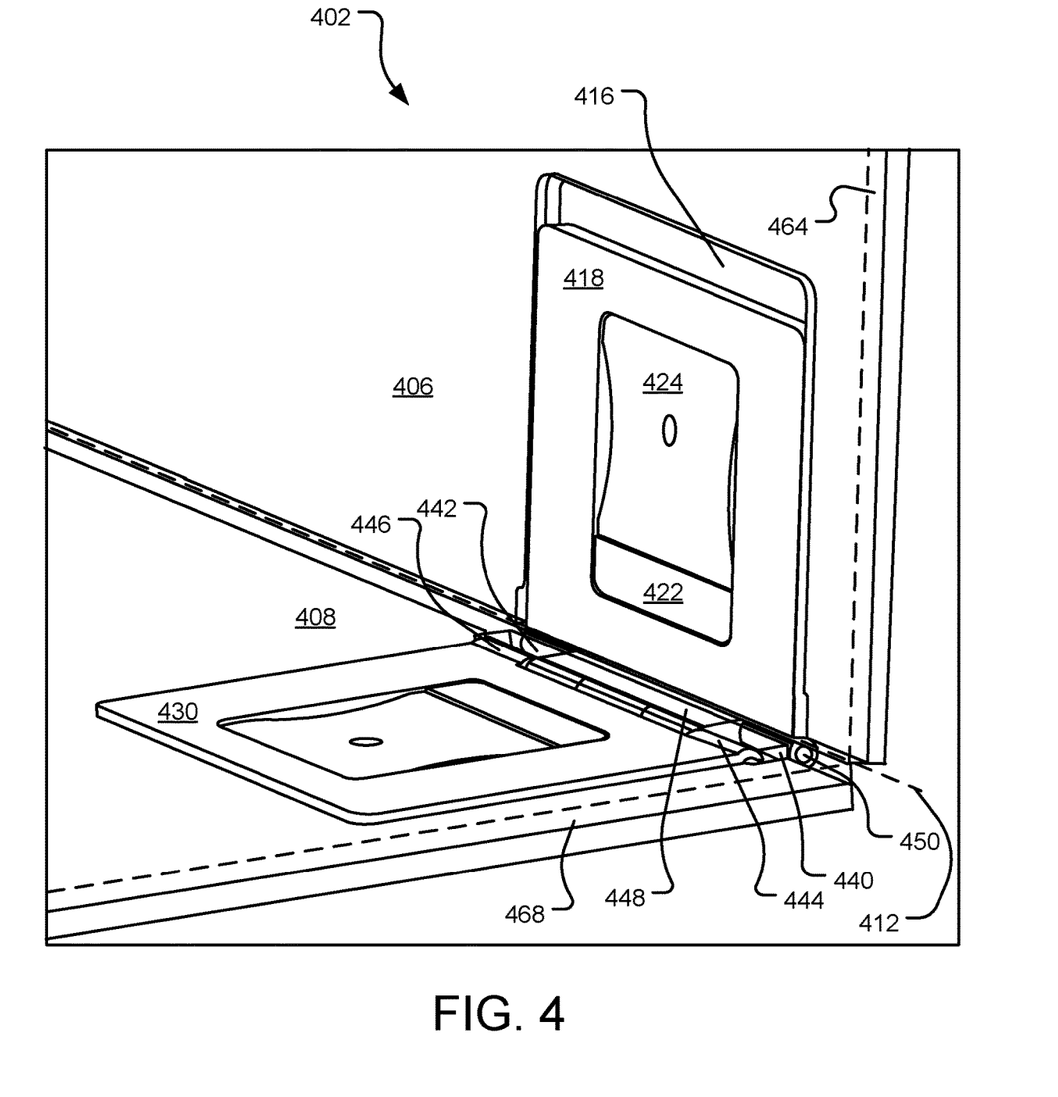
FIG. 4 illustrates a front perspective view of an example sliding double-pivot hinge in a partially open orientation.

FIG. 4 illustrates a front perspective view of an example sliding double-pivot hinge 402 in a partially open orientation. The hinge 402 is one of one or more hinges that pivotally connect a first hinged component 406 with a second hinged component 408. For illustration purposes, the first hinged component 406 and the second hinged component 408 are each illustrated with transparent upper planar layers 464, 468, respectively, that would otherwise conceal much of the hinge 402.

Figure 6:
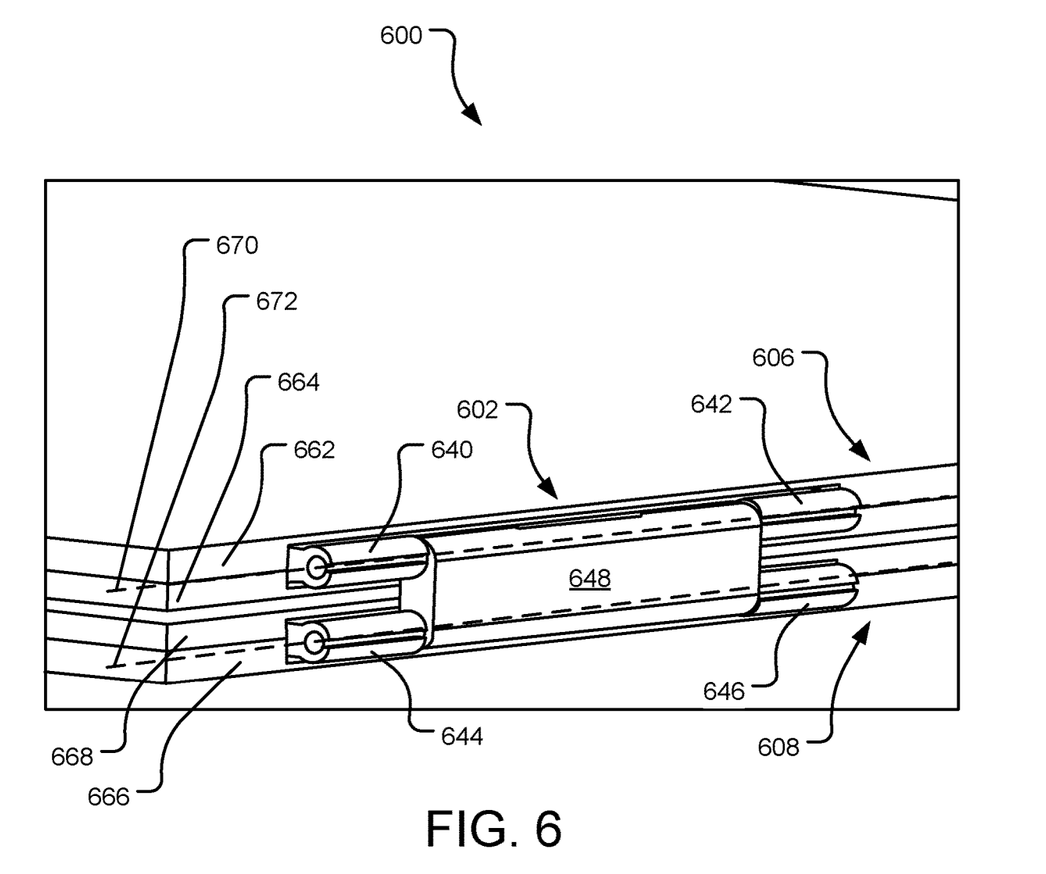
FIG. 6 illustrates a rear partial perspective view of an example computing device having a sliding double-pivot hinge, the computing device in a closed orientation.

An operating range of the hinge 402 may range from fully closed (or where the first hinged component 406 substantially overlies the second hinged component 408, as illustrated in FIG. 6, for example) to fully open (or where the first hinged component 406 is oriented at a maximum oblique angle with reference to the second hinged component 408, which may position the first hinged component 406 coplanar with the second hinged component 408, as illustrated in FIG. 3, for example). The depicted position of the hinge 402 is partially open (at approximately 90 degrees), which is between the foregoing fully closed (approximately 0 degrees) and fully open positions (approximately 180 degrees).

The first hinged component 406 includes a first hinge cavity 416 that substantially matches an outer perimeter of a first leaf 418 of the hinge 402. The first leaf 418 has a generally rectangular outer perimeter with a generally rectangular first stop aperture therein. The generally rectangular outer perimeter permits the first leaf 418 to move (or slide) when placed within the first hinge cavity 416. The first hinge cavity 416 includes a first protruding stop 422 that fits within the first stop aperture. The first protruding stop 422 serves as a fixed point of reference for a first compression spring 424 that is seated within the first stop aperture and adjacent the first protruding stop 422.

The first compression spring 424 is any resiliently compressible structure that has a working stroke within an operating range of the hinge 402. The first compression spring 424 is compressed between the first leaf 418 and the first protruding stop 422 as the first leaf 418 is moved out of the first hinge cavity 416, as shown. This yields the visible first hinge cavity 416. For comparison purposes, a similar second hinge cavity in the second hinged component 408 is not yet visible as a second leaf 430 of the hinge 402 has not slid out of the second hinge cavity at the depicted partially open position of the hinge 402.

The first leaf 418 is depicted as preferentially sliding out of the first hinge cavity 416 prior to the second leaf 430 sliding out of the second hinge cavity at the depicted partially open position of the hinge 402. In other implementations, the second leaf 430 preferentially slides out of the second hinge cavity prior to the first leaf 418 sliding out of the first hinge cavity 416. In still further implementations, the leaves 418, 430 move simultaneously, or non-preferentially as the hinge 402 is moved throughout its range of motion.

The first leaf 418 further includes knuckles 440, 442 that extend from the first leaf 418. The second leaf 430 further includes knuckles 444, 446 that extend from the second leaf 430. A double-barreled link 448 rotationally connects the knuckles 440, 442 of the first leaf 418 to the knuckles 444, 446 of the second leaf 430, via friction pins (e.g., friction pin 450). The knuckles 440, 442, 444, 446 each include a friction band (e.g., a c-shaped or o-shaped band that grips corresponding friction pins). The friction pins are press fit within the knuckles 440, 442, 444, 446 and seated within pin apertures in the double-barreled link 448. The friction pins are intended to remain fixed in position within the pin apertures and the knuckles 440, 442, 444, 446 are permitted to rotate about their respective pins (also referred to as a plain bearing connection). In some implementations, distal ends of the friction pins may be knurled to facilitate their fixed positions within the pin apertures.

A coefficient of friction (static and/or dynamic) between the knuckles 440, 442, 444, 446 and their corresponding friction pins defines the overall resistance to rotation of the hinge 402 about a pivot axis 412 (or overall axis of rotation of the hinge 402. More specifically, coefficients of friction for the knuckles 440, 442, 444, 446, and variation therebetween defines the resistance to rotation about a first leaf rotation axis running through knuckles 440, 442 as compared to a second leaf rotation axis running through knuckles 444, 446.

The aforementioned preferential sliding is of the first leaf 418 over the second leaf 430, or vice versa, is driven by a disparity between the resistance to rotation about a first leaf rotation axis running through knuckles 440, 442 as compared to a second leaf rotation axis running through knuckles 444, 446. Such as disparity may be intentionally designed or result from manufacturing variation within predetermined tolerances.

In various implementations, the hinge 402 includes additional structure associated with the second hinged component 408 similar to that attached to the first hinged component 406, as described above. In other implementations, the hinge 402 structure associated with the second hinged component 408 may differ in various sizes, shapes, and dimensions depending on the design requirements of the overall hinge 402.

Figure 5:
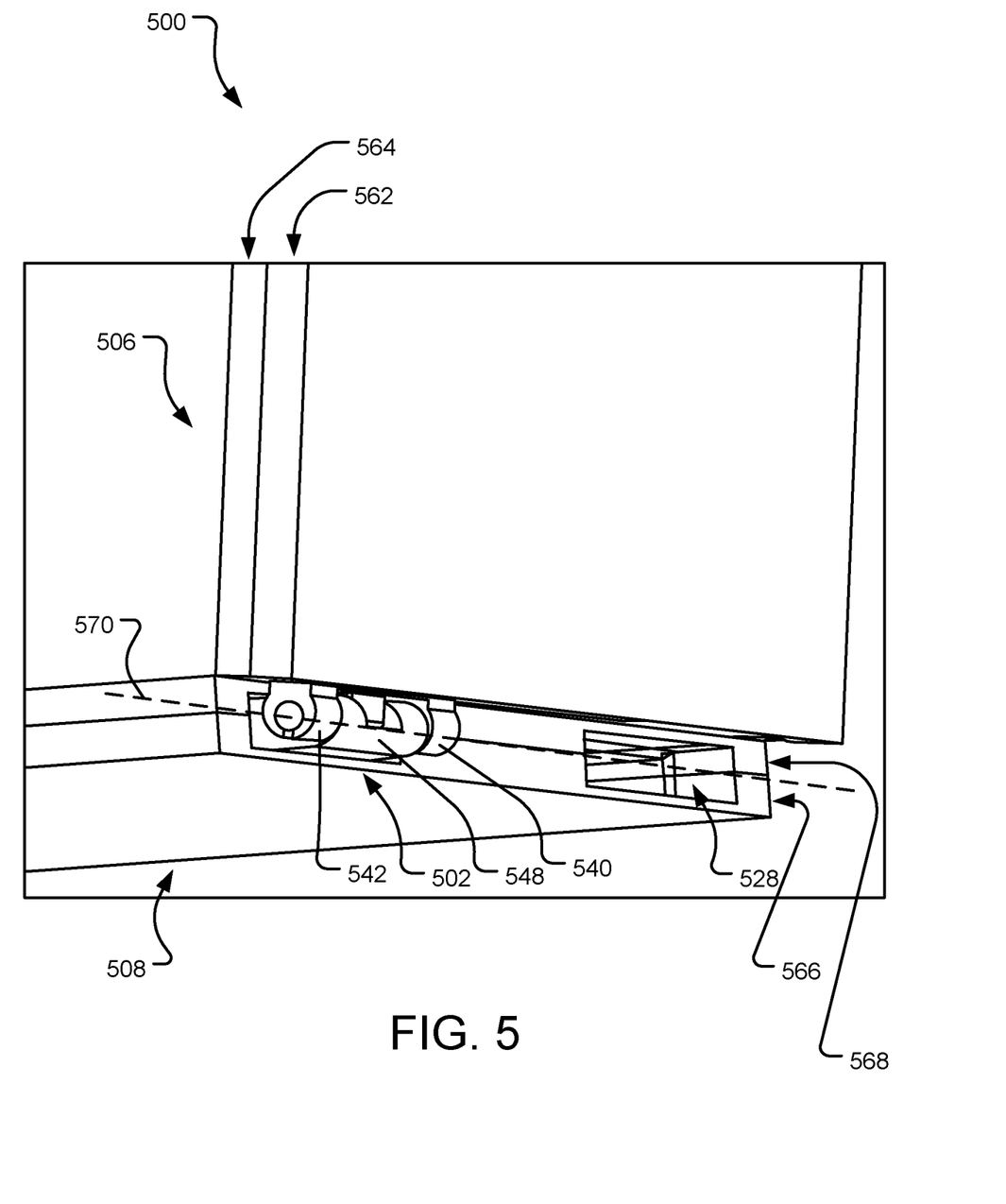
FIG. 5 illustrates a rear partial perspective view of an example computing device having a sliding double-pivot hinge, the computing device in a partially open orientation.

FIG. 5 illustrates a rear partial perspective view of an example computing device 500 having a sliding double-pivot hinge 502, the computing device 500 in a partially open orientation. The hinge 502 is one of two hinges that pivotally connect a first hinged component 506 with a second hinged component 508. The second hinge is not illustrated in FIG. 5 to better illustrate hinge cavity 528, which intended to receive a portion of the second hinge. Details of the second hinge are as described below with reference to hinge 502, and elsewhere herein with reference to various sliding double-pivot hinges. In other implementations, a hinge 502 may be used to connect the first hinged component 506 to the second hinged component 508. Alternatively, greater than two double-pivot hinges may be used to connect the first hinged component 506 to the second hinged component 508. The number and specific location of the double-pivot hinges is selected per the performance requirements of the hinge 502.

The first hinged component 506 is illustrated as a combination of a lower planar layer 562 and an upper planar layer 564. In combination, one or both of the lower planar layer 562 and the upper planar layer 564 are used to form hinge cavities (not shown) occupied by a first portion of the hinge 502 and a first portion of the second hinge (not shown). The second hinged component 508 is illustrated as a combination of a lower planar layer 566 and an upper planar layer 568. In combination, one or both of the lower planar layer 566 and the upper planar layer 566 are used to form a first hinge cavity occupied by a second portion of the hinge 502 and a second hinge cavity 528 occupied by a second portion of the second hinge (not shown).

An operating range of the hinge 502 may range from fully closed (or where the first hinged component 506 substantially overlies the second hinged component 508, as illustrated in FIG. 6, for example) to fully open (or where the first hinged component 506 is oriented at a maximum oblique angle with reference to the second hinged component 508, which may position the first hinged component 506 coplanar with the second hinged component 508, as illustrated in FIG. 3, for example). The depicted position of the hinge 502 is partially open (at approximately 90 degrees), which is between the foregoing fully closed (approximately 0 degrees) and fully open positions (approximately 180 degrees).

A first leaf of the hinge 502 is depicted as preferentially sliding out of its hinge cavity in the first hinged component 506 prior to the second leaf sliding out of its hinge cavity in the second hinged component 508 at the depicted partially open position of the hinge 502. In other implementations, the second leaf preferentially slides out of its hinge cavity prior to the first leaf sliding out of its hinge cavity. In still further implementations, the leaves move simultaneously, or non-preferentially as the hinge 502 is moved throughout its range of motion.

The aforementioned preferential sliding of the first leaf over the second leaf, or vice versa, is driven by a disparity between the resistance to rotation about a first leaf rotation axis 570 running through knuckles 540, 542 of the first leaf as compared to a second leaf rotation axis running through knuckles of the second leaf (not shown). As the first leaf of the hinge 502 slides out of its hinge cavity in the first hinged component 506, a double-barreled link 548 fully exits and is outside of the hinge cavity in the first hinged component 506, as shown. While the second leaf of the hinge 502 remains fully within its hinge cavity in the second hinged component 508, the double-barreled link 548 remains partially recessed within the second hinged component 508, as also shown.

FIG. 6 illustrates a rear partial perspective view of an example computing device 600 having a sliding double-pivot hinge 602, the computing device 600 in a closed orientation. The hinge 602 is one of one or more hinges that pivotally connect a first hinged component 606 with a second hinged component 608. The first hinged component 606 is illustrated as a combination of planar layers 662, 664. In combination, one or both of the planar layers 662, 664 are used to form a first hinge cavity (not shown) occupied by a first portion of the hinge 602. The second hinged component 608 is illustrated as a combination of planar layers 666, 668. In combination, one or both of the planar layers 666, 668 are used to form a second hinge cavity occupied by a second portion of the hinge 602.

An operating range of the hinge 602 may range from fully closed (or where the first hinged component 606 substantially overlies the second hinged component 608, as shown) to fully open (or where the first hinged component 606 is oriented at a maximum oblique angle with reference to the second hinged component 608, which may position the first hinged component 606 coplanar with the second hinged component 608, as illustrated in FIG. 3, for example), with a variety of potential positions or orientations therebetween (see e.g., partially open orientation of FIG. 5).

A first leaf rotation axis 670 runs through knuckles 640, 642 of a first leaf extending from the first hinge cavity of the hinge 602 and a second leaf rotation axis 672 runs through knuckles 644, 646 of the second leaf extending from the second hinge cavity of the hinge 602. In the depicted fully closed orientation, a double-barreled link 648 is fully outside of the hinge cavities and makes up a center-to-center distance between the knuckles 640, 642 and the knuckles 644, 646 (or a distance between the leaf rotation axes 670, 672). This permits an overall axis of rotation of the hinge 602 to remain in the same position throughout a range of motion of the hinge 602.

Figure 7:
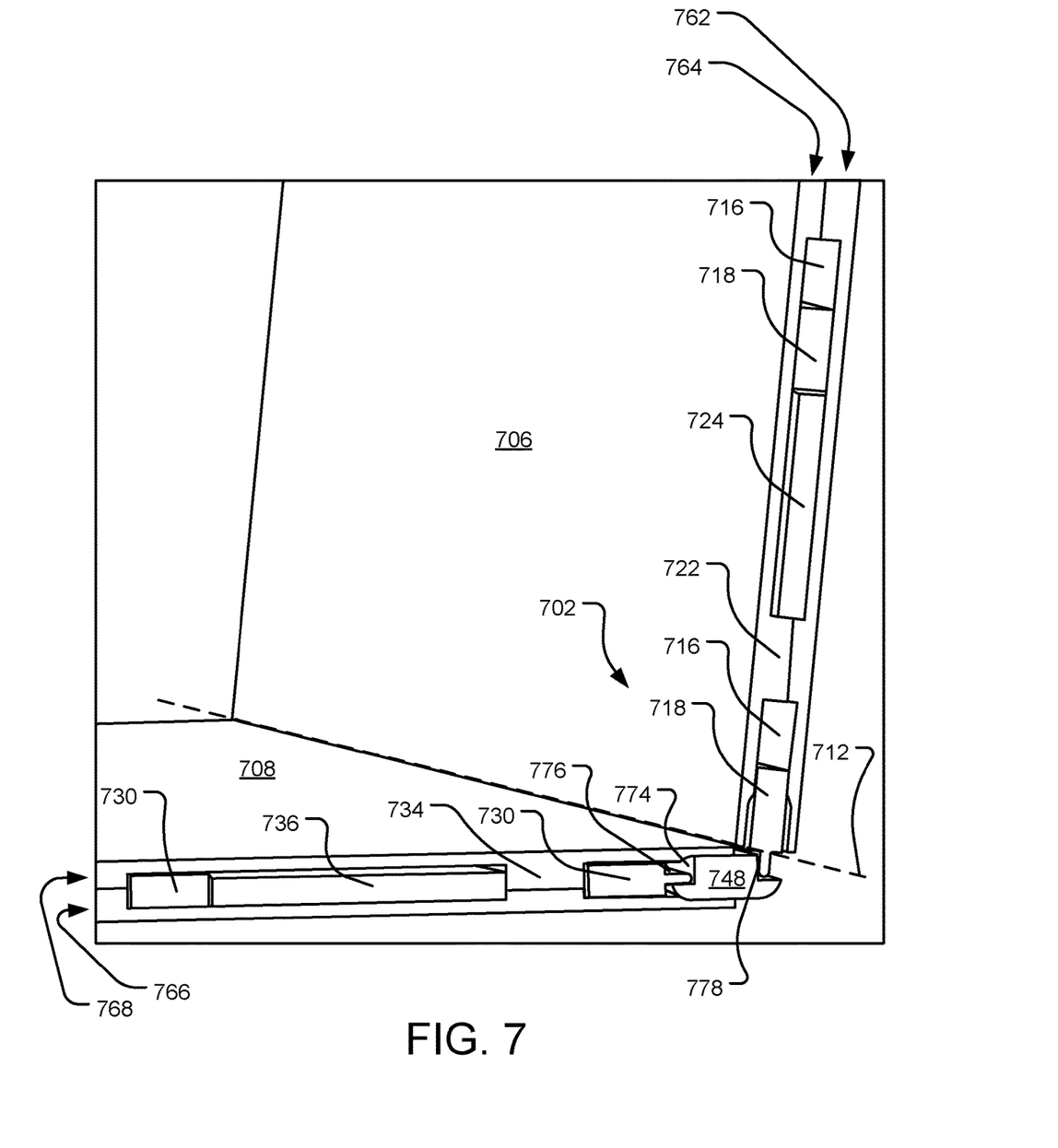
FIG. 7 illustrates a side sectional perspective view of an example sliding double-pivot hinge in a partially open orientation.

FIG. 7 illustrates a side sectional perspective view of an example sliding double-pivot hinge 702 in a partially open orientation. The hinge 702 is one of one or more hinges that pivotally connect a first hinged component 706 with a second hinged component 708. The first hinged component 706 is illustrated as a combination of planar layers 762, 764. In combination, one or both of the planar layers 762, 764 are used to form a first hinge cavity 716 occupied by a first leaf 718 and a first compression spring 724. The second hinged component 708 is illustrated as a combination of planar layers 766, 768. In combination, one or both of the planar layers 766, 768 are used to form a second hinge cavity occupied by a second leaf 730 and a second compression spring 736.

An operating range of the hinge 702 may range from fully closed (or where the first hinged component 706 substantially overlies the second hinged component 708, as illustrated in FIG. 6, for example) to fully open (or where the first hinged component 706 is oriented at a maximum oblique angle with reference to the second hinged component 708, which may position the first hinged component 706 coplanar with the second hinged component 708, as illustrated in FIG. 3, for example). The depicted position of the hinge 702 is partially open (at approximately 90 degrees), which is between the foregoing fully closed (approximately 0 degrees) and fully open positions (approximately 180 degrees).

The first hinge cavity 716 includes a first protruding stop 722. The first protruding stop 722 serves as a fixed point of reference for the first compression spring 724 that is seated adjacent the first protruding stop 722. Similarly, the second hinge cavity 730 includes a second protruding stop 734. The second protruding stop 734 serves as a fixed point of reference for the second compression spring 736 that is seated adjacent the second protruding stop 734.

The compression springs 724, 736 are any resiliently compressible structures that have a working stroke within an operating range of the hinge 702. The first compression spring 724 is compressed between the first leaf 718 and the first protruding stop 722 as the first leaf 718 is moved out of the first hinge cavity 716, as shown. This yields the visible first hinge cavity 716. For comparison purposes, the second hinge cavity in the second hinged component 708 is not yet visible as the second leaf 730 of the hinge 702 has not slid out of the second hinge cavity at the depicted partially open position of the hinge 702.

The first leaf 718 is depicted as preferentially sliding out of the first hinge cavity 716 prior to the second leaf 730 sliding out of the second hinge cavity at the depicted partially open position of the hinge 702. In other implementations, the second leaf 730 preferentially slides out of the second hinge cavity prior to the first leaf 718 sliding out of the first hinge cavity 716. In still further implementations, the leaves 718, 730 move simultaneously, or non-preferentially as the hinge 702 is moved throughout its range of motion.

A double-barreled link 748 rotationally connects the first leaf 718 to the second leaf 730, via knuckles and corresponding friction pins (not shown). A coefficient of friction (static and/or dynamic) between the knuckles and their friction pins defines the overall resistance to rotation of the hinge 702 about a pivot axis 712 (or overall axis of rotation of the hinge 702. The aforementioned preferential sliding is of the first leaf 718 over the second leaf 730, or vice versa, is driven by a disparity between the resistance between the knuckles and their friction pins.

Hard stops (e.g., hard stop 774) are provided on each side of the double-barreled link 748 that interface with stopping surfaces (e.g., stopping surface 776) on each of the leaves 718, 730 to limit rotational travel of each of the leaves 718, 730 and prevent overextension of the leaves 718, 730 from their respective hinge cavities. The technical effect of which is preventing binding of the hinge 702 and damage to the components thereof due to the overextension. Specifically, stopping surface 776 is illustrated at approximately 90 degrees from hard stop 774, indicating that the leaf 730 remains capable of extension from its hinge cavity and rotation about the double-barreled link 748. Conversely, the hard stop and associated stopping surface (collectively, interface 778 are depicted in contact, which prevents further extension of the leaf 718 from its hinge cavity 716 and rotation of the leaf 718 about the double-barreled link 748.

Figure 8:
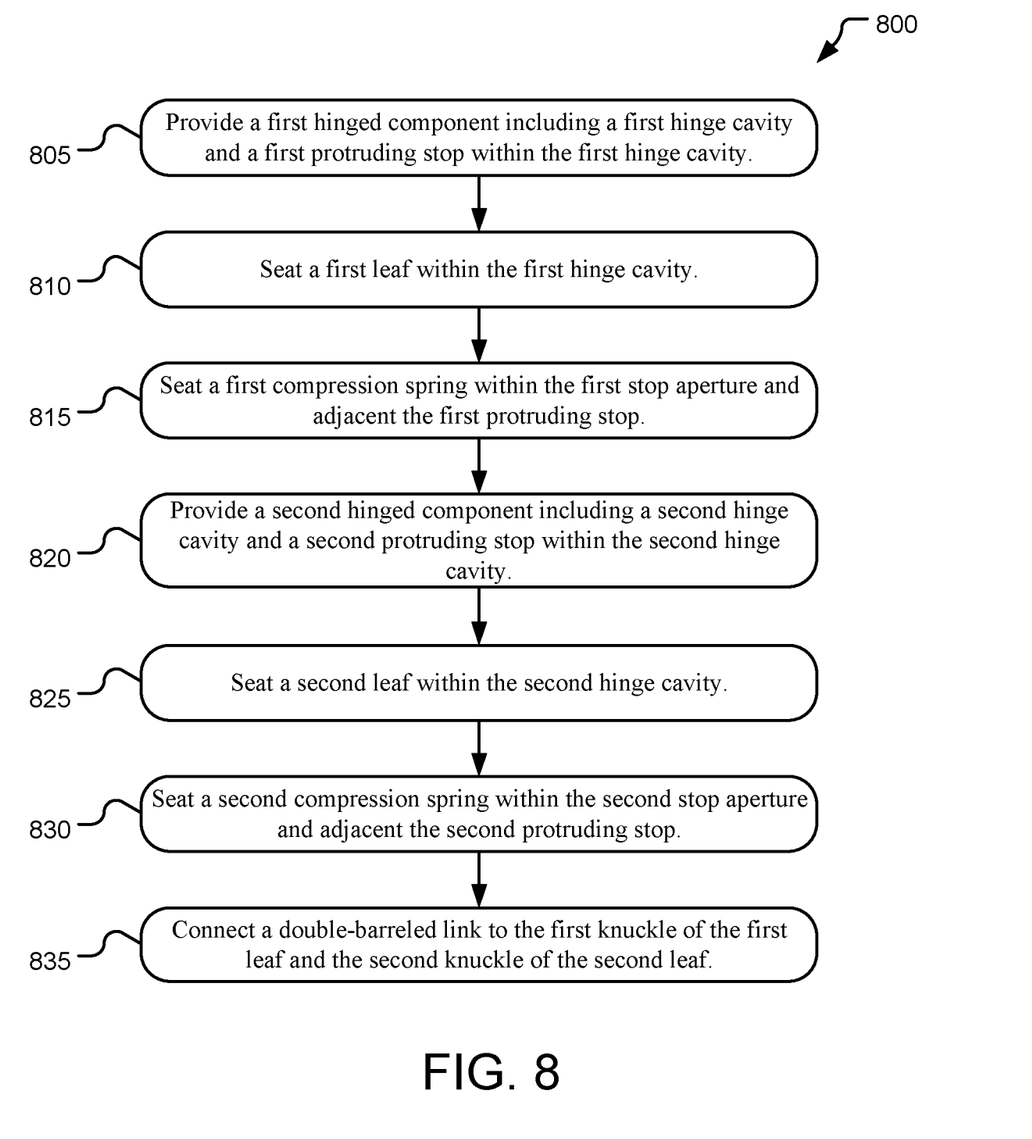
FIG. 8 illustrates example operations for manufacturing a sliding double-pivot hinge.

FIG. 8 illustrates example operations 800 for manufacturing a sliding double-pivot hinge. A first providing operation 805 provides a first hinged component including a first hinge cavity and a first protruding stop within the first hinge cavity. In various implementations, the first hinge cavity may be machined out of or molded within the first hinged component and may lie between two or more planar layers of the first hinged component.

A first seating operation 810 seats a first leaf within the first hinge cavity. The first leaf is constrained to linear motion in and out of the first hinge cavity. Further, the first leaf includes a first stop aperture that receives the first protruding stop and a first knuckle. A second seating operation 815 seats a first compression spring within the first stop aperture and adjacent the first protruding stop. In various implementations, the first compression spring may be a resiliently compressible monolithic block or a mechanical spring.

A second providing operation 820 provides a second hinged component including a second hinge cavity and a second protruding stop within the second hinge cavity. In various implementations, the second hinge cavity may be machined out of or molded within the second hinged component and may lie between two or more planar layers of the second hinged component.

A third seating operation 825 seats second leaf within the second hinge cavity. The second leaf is constrained to linear motion by the second hinge cavity. Further, the second leaf includes a second stop aperture that receives the second protruding stop and a second knuckle. The first leaf and the second leaf may each be formed using any applicable manufacturing method for rigid metals or plastics (e.g., injection molding, other molding techniques, extruding, casting, stamping, and so on).

A fourth seating operation 830 seats a second compression spring within the second stop aperture and adjacent the second protruding stop. In various implementations, the second compression spring may be a resiliently compressible monolithic block or a mechanical spring. The first compression spring and the second compression spring may each be formed using any applicable manufacturing method for resiliently compressible structures (e.g., injection molding, other molding techniques, extruding, casting, die cutting, and so on).

A connecting operation 835 connects a double-barreled link to the first knuckle of the first leaf and the second knuckle of the second leaf. The double-barreled link permits the sliding double-pivot hinge to pivot about each of the first knuckle and the second knuckle. This, in combination with sliding of the first and second leaves within the first and second leaf cavities, respectively, allows a technical effect of the sliding double-pivot hinge maintaining a combined axis of rotation at an abutting interface of the first hinged component and the second hinged component throughout a rotational range of motion (e.g., approximately 0-180 degrees) of the sliding double-pivot hinge. More specifically, maintaining the combined axis of rotation at a fixed position is technically advantageous in that it allows the first hinged component with a second hinged component to remain in contact (or very close proximity) throughout a range of motion of the hinge. While the manufacture and assembly of a singular sliding double-pivot hinge is described in detail in operations 800, multiple sliding double-pivot hinges may be similarly manufactured and assembled for devices that utilize more than one sliding double-pivot hinge.

The logical operations making up the embodiments of the invention described herein may be referred to variously as operations, steps, objects, or modules and may be performed in any order, adding or omitting operations as desired, unless explicitly claimed otherwise or a specific order is inherently necessitated by the claim language. Unless otherwise explicitly defined, dimensions described as substantially or approximately herein are +/−10% of the values provided.

Implementations shown and described herein provide a sliding double pivot hinge comprising a first hinged component including a first hinge cavity and a first protruding stop within the first hinge cavity, a first leaf seated within the first hinge cavity and constrained to linear motion by the first hinge cavity, the first leaf including a first stop aperture that receives the first protruding stop, the first leaf further including a first knuckle, a first compression spring seated within the first stop aperture and adjacent the first protruding stop, a second hinged component including a second hinge cavity and a second protruding stop within the second hinge cavity, a second leaf seated within the second hinge cavity and constrained to linear motion by the second hinge cavity, the second leaf including a second stop aperture that receives the second protruding stop, the second leaf further including a second knuckle, a second compression spring seated within the second stop aperture and adjacent the second protruding stop, and a double-barreled link rotationally connecting the first knuckle of the first leaf to the second knuckle of the second leaf.

Implementations shown and described herein further provide the double-barreled link permits rotation about each of the first knuckle and the second knuckle as the first hinged component is rotated with reference to the second hinged component.

Implementations shown and described herein further provide the first leaf is extendible linearly from the first hinge cavity and the second leaf is extendible linearly from the second hinge cavity as the first hinged component is rotated with reference to the second hinged component.

Implementations shown and described herein further provide the first hinged component has a 180-degree rotational range of motion with reference to the second hinged component.

Implementations shown and described herein further provide a leading edge of the first hinged component abuts a leading edge of the second hinged component.

Implementations shown and described herein further provide an axis of rotation of the first hinged component with reference to the second hinged component is projected along the abutting leading edges of the first hinged component and the second hinged component.

Implementations shown and described herein further provide a flexible cover attached to the first hinged component and the second hinged component, the flexible cover to cover the abutting leading edges of the first hinged component and the second hinged component and to act as a living hinge between the first hinged component and the second hinged component.

Implementations shown and described herein further provide in a fully open orientation, the first leaf is fully recessed within the first hinge cavity, the second leaf is fully recessed within the second hinge cavity, and the double-barreled link is recessed within the first hinge cavity and the second hinge cavity.

Implementations shown and described herein further provide in a fully closed orientation, the first leaf extends from the first hinge cavity, the second leaf extends from the second hinge cavity, and the double-barreled link is outside of the first hinge cavity and the second hinge cavity.

Implementations shown and described herein further provide in a fully closed orientation, the double-barreled link makes up a center-to-center distance between the first knuckle and the second knuckle.

Implementations shown and described herein further provide in a fully open orientation, the first hinged component is coplanar with the second hinged component.

Implementations shown and described herein further provide in a fully closed orientation, the first hinged component overlies the second hinged component.

Implementations shown and described herein further provide a first friction pin rotationally connecting the first knuckle of the first leaf to the double-barreled link, and a second friction pin rotationally connecting the second knuckle of the second leaf to the double-barreled link.

Implementations shown and described herein further provide the first knuckle includes a first friction band defining resistance to rotation of the first leaf with reference to the double-barreled link and the second knuckle includes a second friction band defining resistance to rotation of the second leaf with reference to the double-barreled link.

Implementations shown and described herein further provide the double-barreled link further includes a pair of hard stops to limit rotational travel of the first leaf and the second leaf with reference to the double-barreled link.

Implementations shown and described herein further provide an overall thickness of the sliding double pivot hinge is less than 1.5 mm.

Implementations shown and described herein further provide the first compression spring and the second compression spring each include one of both of a resiliently compressible monolithic material and a mechanical spring.

Implementations shown and described herein provide a method of manufacturing a sliding double pivot hinge comprising providing a first hinged component including a first hinge cavity and a first protruding stop within the first hinge cavity, seating a first leaf within the first hinge cavity, wherein the first leaf is constrained to linear motion by the first hinge cavity, the first leaf including a first stop aperture that receives the first protruding stop, the first leaf further including a first knuckle, seating a first compression spring within the first stop aperture and adjacent the first protruding stop, providing a second hinged component including a second hinge cavity and a second protruding stop within the second hinge cavity, seating a second leaf within the second hinge cavity, wherein the second leaf is constrained to linear motion by the second hinge cavity, the second leaf including a second stop aperture that receives the second protruding stop, the second leaf further including a second knuckle, seating a second compression spring within the second stop aperture and adjacent the second protruding stop, and connecting a double-barreled link to the first knuckle of the first leaf and the second knuckle of the second leaf.

Implementations shown and described herein provide a computing device comprising a first hinged component including a first hinge cavity and a first protruding stop within the first hinge cavity, a first leaf seated within the first hinge cavity and constrained to linear motion by the first hinge cavity, the first leaf including a first stop aperture that receives the first protruding stop, the first leaf further including a first knuckle, a first compression spring seated within the first stop aperture and adjacent the first protruding stop, a second hinged component including a second hinge cavity and a second protruding stop within the second hinge cavity, a second leaf seated within the second hinge cavity and constrained to linear motion by the second hinge cavity, the second leaf including a second stop aperture that receives the second protruding stop, the second leaf further including a second knuckle, a second compression spring seated within the second stop aperture and adjacent the second protruding stop, and a double-barreled link rotationally connecting the first knuckle of the first leaf to the second knuckle of the second leaf.

Implementations shown and described herein further provide the first hinged component and the second hinged component are each one or more of a keyboard, a display screen, a touchscreen, a touchpad, a kickstand, and a screen cover.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:
1. A sliding double pivot hinge comprising:
a first hinged component including a first hinge cavity and a first protruding stop within the first hinge cavity;
a first leaf seated within the first hinge cavity and constrained to linear motion by the first hinge cavity, the first leaf including a first stop aperture that receives the first protruding stop, the first leaf further including a first knuckle;
a first compression spring seated within the first stop aperture and adjacent the first protruding stop;
a second hinged component including a second hinge cavity and a second protruding stop within the second hinge cavity;
a second leaf seated within the second hinge cavity and constrained to linear motion by the second hinge cavity, the second leaf including a second stop aperture that receives the second protruding stop, the second leaf further including a second knuckle;
a second compression spring seated within the second stop aperture and adjacent the second protruding stop; and a double-barreled link rotationally connecting the first knuckle of the first leaf to the second knuckle of the second leaf.

2. The sliding double pivot hinge of claim 1, wherein the double-barreled link permits rotation about each of the first knuckle and the second knuckle as the first hinged component is rotated with reference to the second hinged component.

3. The sliding double pivot hinge of claim 1, wherein the first leaf is extendible linearly from the first hinge cavity and the second leaf is extendible linearly from the second hinge cavity as the first hinged component is rotated with reference to the second hinged component.

4. The sliding double pivot hinge of claim 1, wherein the first hinged component has a 180-degree rotational range of motion with reference to the second hinged component.

5. The sliding double pivot hinge of claim 1, wherein a leading edge of the first hinged component abuts a leading edge of the second hinged component.

6. The sliding double pivot hinge of claim 5, wherein an axis of rotation of the first hinged component with reference to the second hinged component is projected along the abutting leading edges of the first hinged component and the second hinged component.

7. The sliding double pivot hinge of claim 5, further comprising:
a flexible cover attached to the first hinged component and the second hinged component, the flexible cover to cover the abutting leading edges of the first hinged component and the second hinged component and to act as a living hinge between the first hinged component and the second hinged component.

8. The sliding double pivot hinge of claim 1, wherein in a fully open orientation, the first leaf is fully recessed within the first hinge cavity, the second leaf is fully recessed within the second hinge cavity, and the double-barreled link is recessed within the first hinge cavity and the second hinge cavity.

9. The sliding double pivot hinge of claim 1, wherein in a fully closed orientation, the first leaf extends from the first hinge cavity, the second leaf extends from the second hinge cavity, and the double-barreled link is outside of the first hinge cavity and the second hinge cavity.

10. The sliding double pivot hinge of claim 1, wherein in a fully closed orientation, the double-barreled link makes up a center-to-center distance between the first knuckle and the second knuckle.

11. The sliding double pivot hinge of claim 1, wherein in a fully open orientation, the first hinged component is coplanar with the second hinged component.

12. The sliding double pivot hinge of claim 1, wherein in a fully closed orientation, the first hinged component overlies the second hinged component.

13. The sliding double pivot hinge of claim 1, further comprising:
a first friction pin rotationally connecting the first knuckle of the first leaf to the double-barreled link; and
a second friction pin rotationally connecting the second knuckle of the second leaf to the double-barreled link.

14. The sliding double pivot hinge of claim 1, wherein the first knuckle includes a first friction band defining resistance to rotation of the first leaf with reference to the double-barreled link and the second knuckle includes a second friction band defining resistance to rotation of the second leaf with reference to the double-barreled link.

15. The sliding double pivot hinge of claim 1, wherein the double-barreled link further includes a pair of hard stops to limit rotational travel of the first leaf and the second leaf with reference to the double-barreled link.

16. The sliding double pivot hinge of claim 1, wherein an overall thickness of the sliding double pivot hinge is less than 1.5 mm.

17. The sliding double pivot hinge of claim 1, wherein the first compression spring and the second compression spring each include one of both of a resiliently compressible monolithic material and a mechanical spring.

18. A method of manufacturing a sliding double pivot hinge comprising:
providing a first hinged component including a first hinge cavity and a first protruding stop within the first hinge cavity;
seating a first leaf within the first hinge cavity, wherein the first leaf is constrained to linear motion by the first hinge cavity, the first leaf including a first stop aperture that receives the first protruding stop, the first leaf further including a first knuckle;
seating a first compression spring within the first stop aperture and adjacent the first protruding stop;
providing a second hinged component including a second hinge cavity and a second protruding stop within the second hinge cavity;
seating a second leaf within the second hinge cavity, wherein the second leaf is constrained to linear motion by the second hinge cavity, the second leaf including a second stop aperture that receives the second protruding stop, the second leaf further including a second knuckle;
seating a second compression spring within the second stop aperture and adjacent the second protruding stop; and
connecting a double-barreled link to the first knuckle of the first leaf and the second knuckle of the second leaf.

19. A computing device comprising:
a first hinged component including a first hinge cavity and a first protruding stop within the first hinge cavity;
a first leaf seated within the first hinge cavity and constrained to linear motion by the first hinge cavity, the first leaf including a first stop aperture that receives the first protruding stop, the first leaf further including a first knuckle;
a first compression spring seated within the first stop aperture and adjacent the first protruding stop;
a second hinged component including a second hinge cavity and a second protruding stop within the second hinge cavity;
a second leaf seated within the second hinge cavity and constrained to linear motion by the second hinge cavity, the second leaf including a second stop aperture that receives the second protruding stop, the second leaf further including a second knuckle;
a second compression spring seated within the second stop aperture and adjacent the second protruding stop; and
a double-barreled link rotationally connecting the first knuckle of the first leaf to the second knuckle of the second leaf.

20. The computing device of claim 19, wherein the first hinged component and the second hinged component are each one or more of a keyboard, a display screen, a touchscreen, a touchpad, a kickstand, and a screen cover.

* * * * *